United States Patent
Curlee et al.

(12)

(10) Patent No.: US 6,665,178 B2
(45) Date of Patent: Dec. 16, 2003

(54) DESKTOP COMPUTER CHASSIS WITH FOLDING COVER

(75) Inventors: James D. Curlee, Round Rock, TX (US); Andrew W. Moore, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 09/885,507

(22) Filed: Jun. 20, 2001

(65) Prior Publication Data

US 2002/0196603 A1 Dec. 26, 2002

(51) Int. Cl.⁷ .................................................. G06F 1/16
(52) U.S. Cl. ........................ 361/687; 361/686; 361/725; 213/223.1; 213/223.2
(58) Field of Search .................................. 361/680–687, 361/724–727, 741, 756; 70/159–162; 109/67, 68; 312/244, 298, 215, 219, 311, 223.1, 223.2; 220/4.02, 254, 255; 411/182, 549, 553; 364/708.1

(56) References Cited

U.S. PATENT DOCUMENTS

| | | | | |
|---|---|---|---|---|
| 5,051,868 A | * | 9/1991 | Leverault et al. ............ | 361/683 |
| 5,337,464 A | | 8/1994 | Steffes | |
| 5,347,430 A | | 9/1994 | Curlee et al. | |
| 5,438,476 A | | 8/1995 | Steffes | |
| 5,495,389 A | * | 2/1996 | Dewitt et al. ................. | 361/683 |
| 5,561,893 A | * | 10/1996 | Lee .............................. | 29/434 |
| 5,661,640 A | | 8/1997 | Mills et al. | |
| 5,701,231 A | * | 12/1997 | Do et al. ...................... | 361/683 |
| 5,745,342 A | * | 4/1998 | Jeffries et al. ................ | 361/683 |
| 5,941,617 A | * | 8/1999 | Crane et al. .................. | 312/204 |
| 5,995,363 A | * | 11/1999 | Wu .............................. | 361/679 |
| 5,999,416 A | * | 12/1999 | McAnally et al. ............ | 361/816 |
| 6,233,152 B1 | * | 5/2001 | Abbott et al. ................ | 361/725 |
| 6,373,690 B1 | * | 4/2002 | Buican et al. ................ | 361/683 |

FOREIGN PATENT DOCUMENTS

EP    896272 A2 *  2/1999   ............. G06F/1/18

OTHER PUBLICATIONS

An article: "Mechanical Packaging Scheme With Considerations for Maximum ESD/EMC Protection, Efficient Cooling and Quie Office Environment", IBM Technical Disclosure Bulletin, Feb. 1991, US; vol. 33, Issue 9; pp. 379–383).*

* cited by examiner

*Primary Examiner*—Michael Datskovsky
(74) *Attorney, Agent, or Firm*—Haynes and Boone, LLP

(57) ABSTRACT

A computer chassis includes a base portion formed of a metal chassis and a cosmetic cover. A top portion of the chassis is formed of a metal chassis and a cosmetic cover. A plurality of first computer components are mounted in the base portion. A plurality of second computer components are mounted in the top portion. A pivotal connection is provided between the top portion and the base portion. The top portion is pivotable about 90° relative to the base portion to an open position immediately exposing all of the first and second computer components for access, without removing any of the cosmetic covers.

18 Claims, 4 Drawing Sheets

DESKTOP COMPUTER CHASSIS WITH FOLDING COVER

BACKGROUND

The disclosures herein relate generally to a computer system and more particularly to the arrangement of components in a computer system chasis.

Today's customers are asking for smaller chassis enclosures without giving up performance or serviceability. The components inside the chassis are not getting smaller and in some cases growing larger. The problem is to more efficiently package components and still maintain a high level of manufacturability and serviceability.

Today's chassis are about 50% volume efficient. In every desktop chassis today, extra room is left inside the chassis for hand/access room for manufacturing and service. This extra room creates larger chassis than customers are demanding and drives up shipping and material cost for the larger enclosures.

Therefore, what is needed is a computer chassis that is not oversized and can compactly house all of the computer components for easy access.

SUMMARY

One embodiment, accordingly, provides a swing-open computer chassis. To this end, a computer chassis includes a base portion formed of a metal chassis and a cosmetic cover. A top portion of the chassis is formed of a metal chassis and a cosmetic cover. A plurality of first computer components are mounted in the base portion. A plurality of second computer components are mounted in the top portion. A pivotal connection is provided between the top portion and the base portion. The top portion is pivotable about 90° relative to the base portion to an open position immediately exposing all of the first and second computer components for access, without removing any of the cosmetic covers.

A principal advantage of this embodiment is that the computer chassis size is maintained due to the compact positioning of components in the top and base chassis portions. The open chassis provides for top down assembly and total system access. The chassis may be opened and closed without removing any of the cosmetic covers.

DETAILED DESCRIPTION

Figure 1:
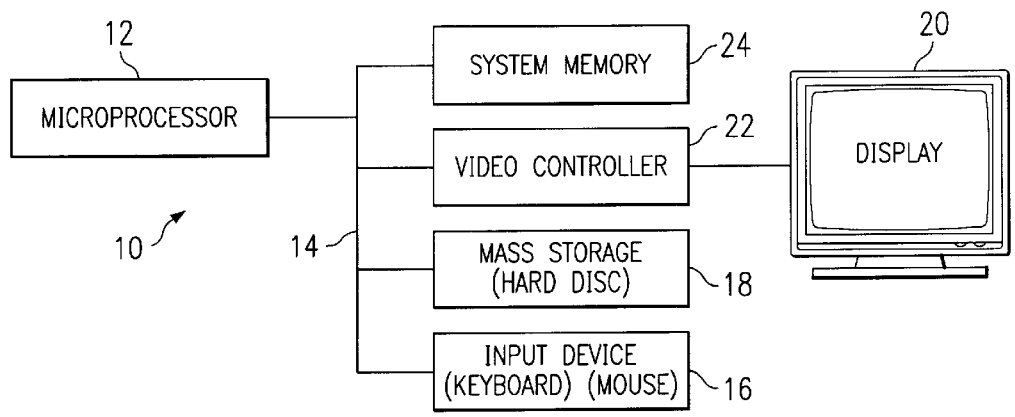
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
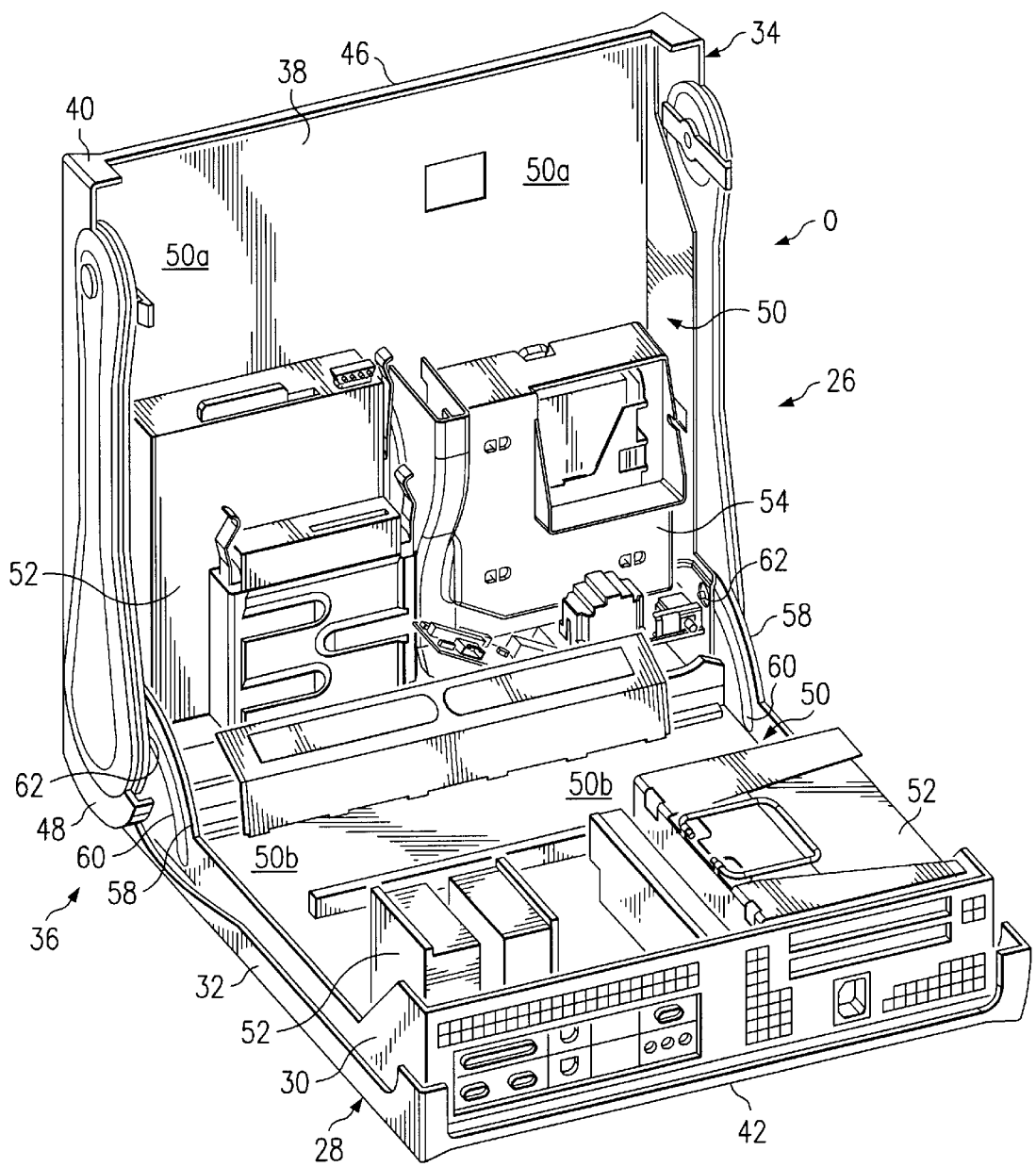
FIG. 2 is a perspective view illustrating an embodiment of a chassis in an open position.

A chassis 26, FIG. 2, is provided to support all or most of the components of system 10, as set forth above. Chassis 26 includes a base portion 28 formed of a metal portion 30 and an outer plastic cosmetic cover 32. A top portion 34 of chassis 26 is pivotally connected to base portion 28 at a hinge connection generally designated 36. Top portion 34 includes a metal portion 38 and an outer plastic cosmetic cover 40. The base portion 28 includes a base surface 42. The cosmetic cover 40 includes a top surface 46 and an endwall 48. The base portion 28 forms part of a cavity 50 in chassis 26 for containing a plurality of first computer components 52, and the top portion 34 forms another part of the cavity 50 for containing a plurality of second computer components 54.

Figure 3:
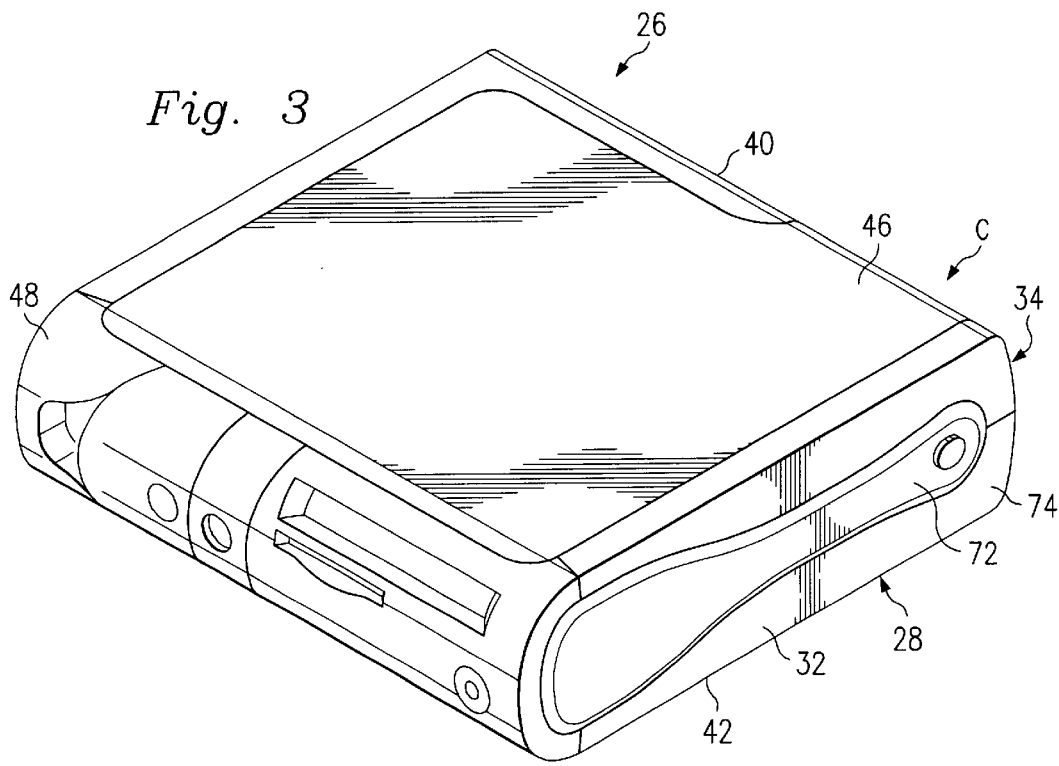
FIG. 3 is a perspective view illustrating the chassis in a closed position.

The hinge connection 36 permits the top portion 34 to pivot to an open position O about 90° relative to base portion 28, and to pivot to a closed position C, FIG. 3, wherein the top portion 34 and base portion nest together to define the cavity 50. It is understood that the open position O may be more or less than 90° as desired.

Figure 4:
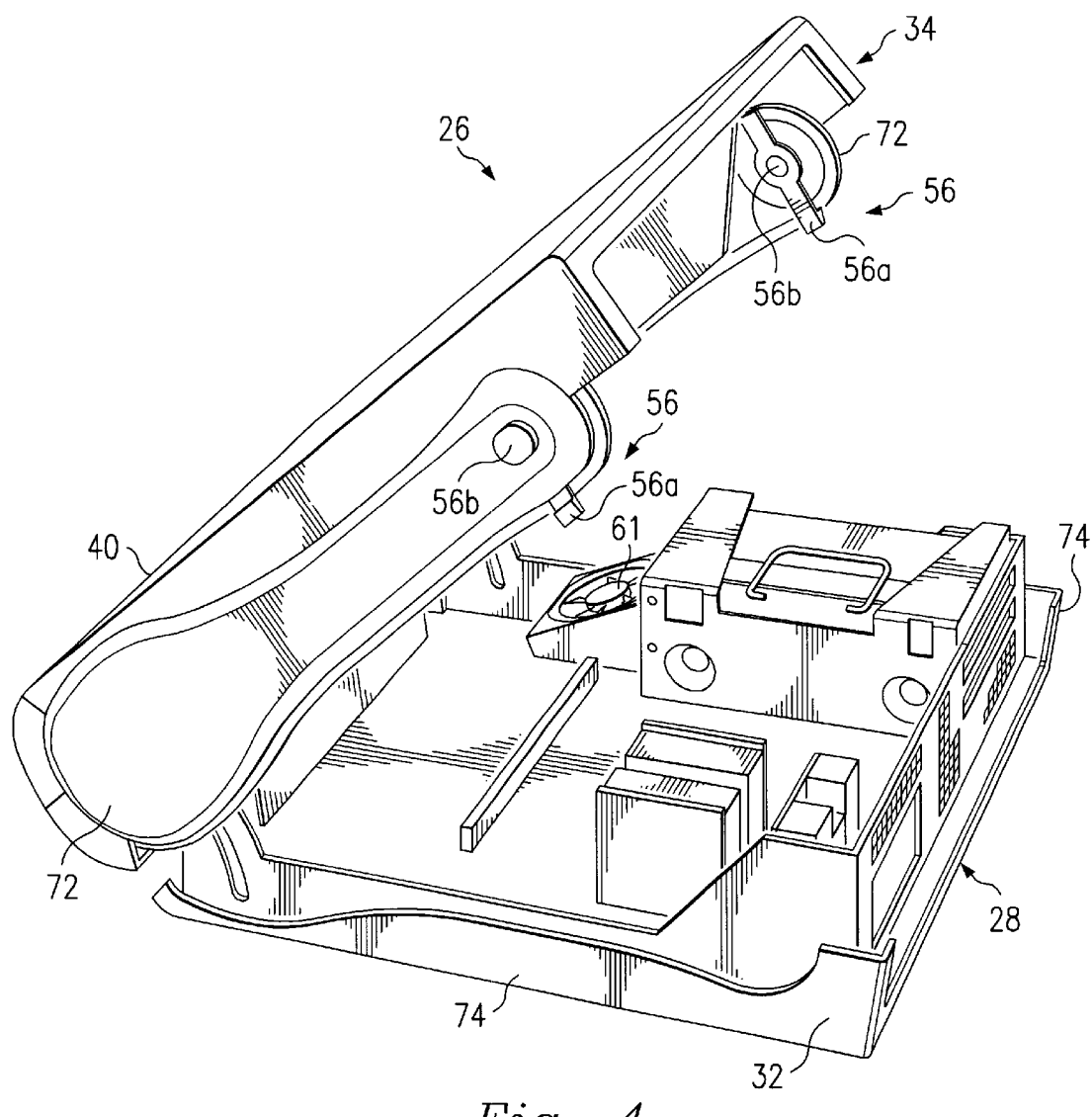
FIG. 4 is another perspective view illustrating the chassis in the open position.

A pair of side panels 72, FIGS. 3 and 4, of top cosmetic cover 40 are configured to nest with a complimentary configured pair of side panels 74 of base cosmetic cover 32 when chassis 26 is in the closed position C. When closed, the top portion 34 is automatically secured to the bottom portion 28 by a releasable latch 56, extending from each side panel 72 of top portion 34, which includes a latch member 56a and a release button 56b which permits latch member 56a to disengage from bottom portion 28.

Pivotal movement of to portion 34, FIG. 2, relative to bottom portion 28 is assisted by the hinge connection 6 including a pair of arcuate guides 58 attached to base portion 28. A groove 60 in guides 58 receives a pin 62 attached to top portion 34 for sliding movement in grooves 60.

Figure 5:
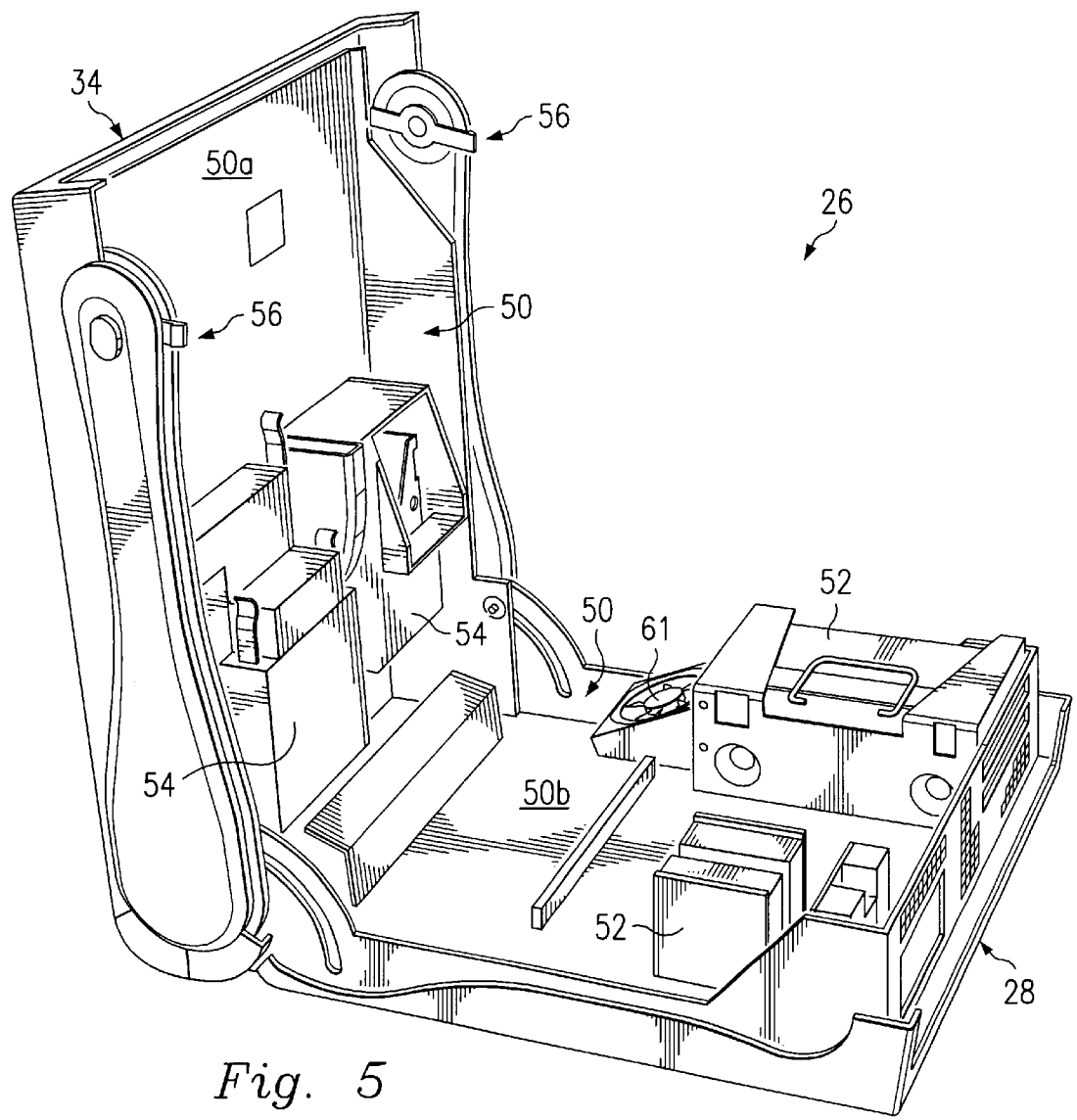
FIG. 5 is a further perspective view illustrating the chassis in the open position.

First components 52, FIG. 5, are positioned in base portion 28, and second components 54 are positioned in top portion 34 so that when chassis 26 is closed, a void area 50a of cavity 50 in top portion 34, is filled with first components 52. Likewise, a void area 50b of cavity 50 in base portion 28, is filled with second components 54. In this manner, when chassis 26 is closed, first components 52 are nested side-by-side with second components 54. This also ensures that when chassis 26 is opened, access to components 52, 54 is enhanced, and when chassis 26 is closed, space in cavity 50 is maximally utilized. For example, second components 54 in top portion 34 are positioned adjacent a fan 61 in base portion 28 for cooling, thus enhancing the mutually complimentary arrangement of components in chassis 50. Furthermore, when chassis 50 is opened, there is no requirement to remove any cosmetic covers from the metal chassis frame, only disengagement of latch 56 is required.

As a result, one embodiment provides a computer chassis comprising a base portion formed of a metal chassis and a cosmetic cover; a top portion formed of a metal chassis and a cosmetic cover; a plurality of first computer components mounted in the base portion; a plurality of second computer components mounted in the top portion; a pivotal connection between the top portion and the base portion; and the top portion being pivotable relative to the base portion to an open position immediately exposing all of the first and second computer components for access, without removing any of the cosmetic covers.

Another embodiment provides a computer chassis comprising a base portion including a base surface and an integral end wall formed of a metal chassis and a cosmetic cover; a top portion including a top surface and an integral end wall formed of a metal chassis and a cosmetic cover; a plurality of first computer components mounted in the base portion; a plurality of second computer components mounted in the top portion; and a pivotal connection between the top portion and the base portion, whereby a single pivotable movement of the top portion and its integral end wall relative to the base portion to an open position, immediately exposes all of the first and second computer components for access, without removing any of the cosmetic covers.

A further embodiment provides a computer system comprising a chassis having an internal computer component cavity defined therein; a microprocessor mounted in the chassis; a storage coupled to the microprocessor; a video controller coupled to the microprocessor; a memory coupled to provide storage to facilitate execution of computer programs by the microprocessor; a base portion of the chassis formed of a metal portion and a cosmetic cover; a top portion of the chassis formed of a metal portion and a cosmetic cover; a plurality of first computer components mounted in the base portion; a plurality of second computer components mounted in the top portion; a pivotal connection between the top portion and the base portion; and the top portion being pivotable relative to the base portion to an open position immediately exposing the cavity and the plurality of first and second computer components for access, without removing any of the cosmetic covers.

As can be seen, the principal advantages of these embodiments are that this device creates an extremely open frame chassis that gives manufacturing and service technicians more access room than typical desktop chassis. Once the chassis is closed, it allows components to be nested closer together creating a smaller denser chassis enclosure. The enclosure opens by moving the top cover and front wall of the chassis forward to about 90 degrees from the original orientation. This creates the open enclosure that allows 100% top down assembly in manufacturing. The top opens with the outer plastic cosmetic cover on the metal frame. This ability is drastically different and time saving than any other or previous chassis available. The metal chassis top and cosmetic cover no longer need to be removed to manufacture or service the chassis. Instead of removing the metal top and the cosmetic cover, the operator pivots the top to the open position allowing direct access to all components.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer chassis comprising:
   a base portion formed of a metal chassis and a cosmetic cover;
   a top portion form d of a metal chassis and a cosmetic cover;
   a plurality of first computer components mounted in the base portion;
   a plurality of second computer components mounted in the top portion;
   a pivotal connection between the top portion and the base portion, the pivotal connection including arcuate guides on the base portion; and
   the top portion being pivotable relative to the base portion to an open position immediately exposing all of the first and second computer components for access, without removing any of the cosmetic covers.

2. The chassis as defined in claim 1 wherein the top and bottom portions include side panels which nest together when the top portion is pivoted into engagement with the bottom portion in a closed position, and wherein the first computer components are nested side-by-side with the second computer components when the top and bottom portions are in the closed position.

3. The chassis as defined in claim 2 wherein the engagement of the top portion with the bottom portion is maintained by a releasable latch.

4. The chassis as defined in claim 2 wherein the second computer components in the top portion are cooled by a fan mounted in the base portion, the fan being positioned adjacent the second computer component when the top portion is in the closed position.

5. The chassis as defined in claim 1 wherein the top portion includes pins slidably connected to the arcuate guides.

6. The chassis as defined in claim 2 wherein engagement of the top portion with the bottom portion is maintained by a latch on each side panel.

7. A computer chassis comprising:
   a base portion including a base surface and an integral end wall formed of a metal chassis and a cosmetic cover;
   a top portion including a top surface and an integral end wall formed of a metal chassis and a cosmetic cover;
   a plurality of first computer components mounted in the base portion;
   a plurality of second computer components mounted in the top portion; and
   a pivotal connection between the top portion and the base portion, the pivotal connection including arcuate guides on the base portion, whereby a single pivotable movement of the top portion and its integral end wall relative to the base portion to an open position, immediately exposes all of the first and second computer components for access, without removing any of the cosmetic covers.

8. The chassis as defined in claim 7 wherein the top and bottom portions include side panels which nest together when the top portion is pivoted into engagement with the bottom portion in a closed position.

9. The chassis as defined in claim 8 wherein the engagement of the top portion with the bottom portion is maintained by a releasable latch.

10. The chassis as defined in claim 9 wherein the second computer components in the top portion are cooled by a fan mounted in the base portion, the fan being positioned adjacent the second computer component when the top portion is in the closed position.

11. The chassis as defined in claim 7 wherein the top portion includes pins slidably connected to the arcuate guides.

12. A computer system comprising:
   a chassis having an internal computer component cavity defined therein;
   a microprocessor mounted in the chassis;
   a storage coupled to the microprocessor;
   a base portion of the chassis formed of a metal portion and a cosmetic cover;
   a top portion of the chassis formed of a metal portion and a cosmetic cover;
   a plurality of first computer components mounted in the base portion;
   a plurality of second computer components mounted in the top portion;
   a pivotal connection between the top portion and the base portion, the pivotal connection including arcuate guides on the base portion; and
   the top portion being pivotable relative to the base portion to an open position immediately exposing the cavity and the plurality of first and second computer components for access, without removing any of the cosmetic covers.

13. Th system as defined in claim 12 wherein the top and bottom portions include side panels which nest together when the top portion is pivoted into engagement with the bottom portion in a closed position.

14. Th system as defined in claim 13 wherein the engagement of the top portion with the bottom portion is maintained by a releasable latch.

15. The system as defined in claim 13 wherein the second computer components in the top portion are cooled by a fan mounted in the base portion, the fan being positioned adjacent the second computer components when the to portion is in the closed position.

16. The system as defined in claim 12 wherein the top portion includes pins slidably connected to the arcuate guides.

17. The system as defined in claim 13 wherein engagement of the top portion with the bottom portion is maintained by a latch on each side panel.

18. A computer chassis comprising:
   a base portion formed of a metal chassis and a cosmetic cover;
   a top portion formed of a metal chassis and a cosmetic cover;
   a plurality of first computer components mounted in the base portion;
   a plurality of second computer components mounted in the top portion;
   a pivotal connection including an arcuate guide interconnecting the base portion and the top portion, and a pin slidably connected to the arcuate guide; and
   the top portion being pivotable relative to the base portion to an open position immediately exposing all of the first and second computer components for access, without removing any of the cosmetic covers.

* * * * *